United States Patent
Buehler et al.

(10) Patent No.: US 8,574,518 B2
(45) Date of Patent: *Nov. 5, 2013

(54) PRODUCTION OF IRON ORTHOPHOSPHATE

(75) Inventors: Gunnar Buehler, Nickenich (DE); Kilian Schwarz, Mainz (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/203,337

(22) PCT Filed: Feb. 19, 2010

(86) PCT No.: PCT/EP2010/052108
§ 371 (c)(1),
(2), (4) Date: Nov. 4, 2011

(87) PCT Pub. No.: WO2010/097341
PCT Pub. Date: Sep. 2, 2010

(65) Prior Publication Data
US 2012/0039783 A1  Feb. 16, 2012

(30) Foreign Application Priority Data
Feb. 26, 2009  (DE) .......................... 10 2009 001 204

(51) Int. Cl.
C01G 49/00  (2006.01)
C01B 25/26  (2006.01)

(52) U.S. Cl.
USPC .......................................... 423/140; 423/311

(58) Field of Classification Search
USPC ................. 423/140, 304, 308, 309, 311–313, 423/594.1, 632; 252/182.1
See application file for complete search history.

(56) References Cited

U.S. PATENT DOCUMENTS 3,070,423 A  12/1962  Alexander et al.
3,407,034 A  10/1968  Bennetch et al.

(Continued)

FOREIGN PATENT DOCUMENTS

| DE | 102007049757 A1 | 10/2007 |
|---|---|---|
| EP | 1094532 A1 | 4/2001 |
| SU | 1549916 A1 | 12/1986 |
| WO | 0230815 A1 | 4/2002 |
| WO | WO 0230815 A1 * | 4/2002 |
| WO | 2009030815 A1 | 3/2009 |
| WO | 2009050055 A2 | 4/2009 |

OTHER PUBLICATIONS

Reale, P., et al., Synthesis and Thermal Behavior of Hydrated Iron(III) Phosphates of Interest as Positive Electrodes in Li Batteries.

(Continued)

Primary Examiner — Steven Bos
Assistant Examiner — Justin Bova
(74) Attorney, Agent, or Firm — Michael L. Dunn

(57) ABSTRACT

A process for the production of iron (III) orthophosphate of the general formula $FePO_4 \times nH_2O$ ($n \leq 2.5$) comprising: a) producing an aqueous solution containing $Fe^{2+}$ ions by introducing, iron (II), iron (III) or mixed iron (II, III) compounds selected from hydroxides, oxides, oxide hydroxides, oxide hydrates, carbonates and hydroxide carbonates, together with elementary iron, into a phosphoric acid-bearing aqueous medium, to dissolve $Fe^{2+}$ ions and to react $Fe^{3+}$ with elementary Fe in a comproportionation reaction to give $Fe^{2+}$; b) separating solids from the phosphoric-acid aqueous $Fe^{2+}$ solution, and c) adding an oxidation agent to the phosphoric-acid aqueous $Fe^{2+}$ solution to oxidize iron (II) in the solution to precipitate iron (III) orthophosphate of the general formula $FePO_4 \times nH_2O$. The invention includes the product of the process and its use to make $LiFePO_4$ for batteries.

14 Claims, 2 Drawing Sheets an XRD spectrum of the iron (III) orthophosphate of Figure 1a.

(56) References Cited

U.S. PATENT DOCUMENTS

| | | | |
|---|---|---|---|
| 6,350,474 B1 * | 2/2002 | Dzneladze et al. | 424/605 |
| 6,498,119 B2 * | 12/2002 | Wagh et al. | 501/111 |
| 7,285,260 B2 | 10/2007 | Armand et al. | |
| 2003/0064287 A1 | 4/2003 | Masquelier et al. | |
| 2004/0086445 A1 | 5/2004 | Armand et al. | |
| 2006/0090768 A1 | 5/2006 | Fournier et al. | |

OTHER PUBLICATIONS

Zhicong Shi et al., Electrochemical and Solid State Letters 2005, 8, A396-A399.

* cited by examiner

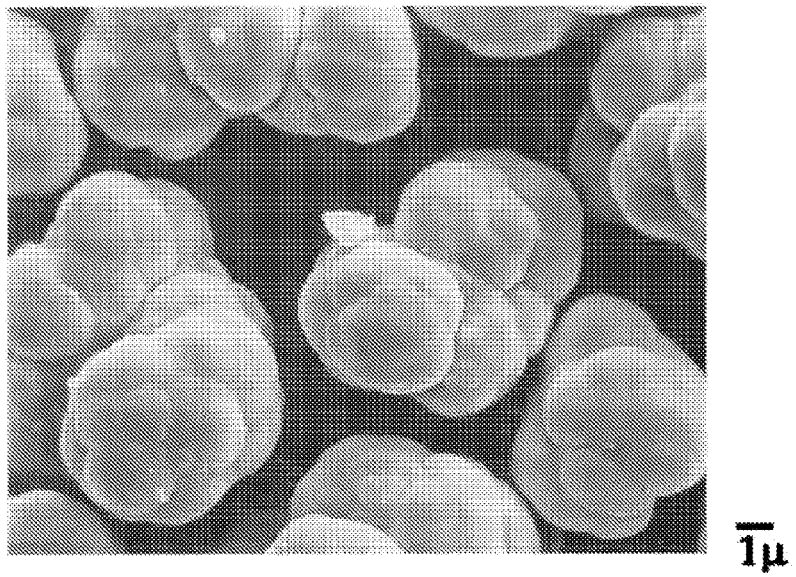
Figure 1a: a scanning electron microscope image of an iron (III) orthophosphate with a metastrengite I crystal structure produced in accordance with a known process in accordance with the state of the art from Fe(II)SO$_4$.
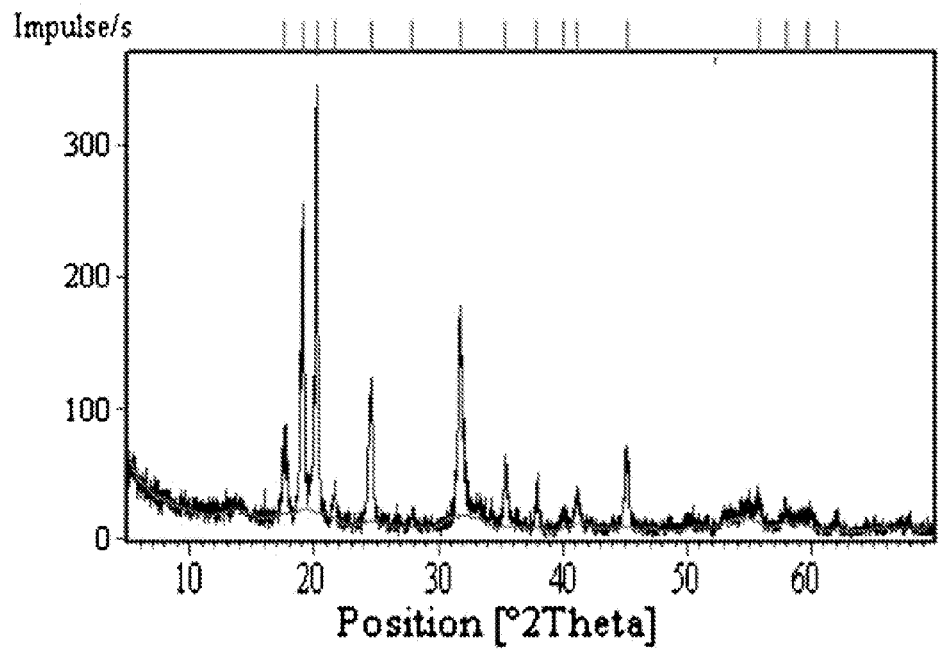
Figure 1b: an XRD spectrum of the iron (III) orthophosphate of Figure 1a.

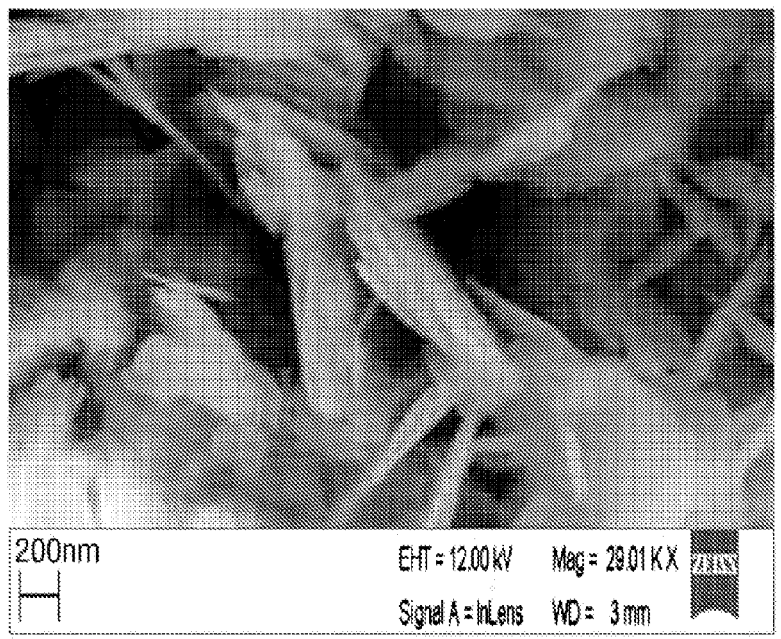
Figure 2a: a scanning electron microscope image of iron (III) orthophosphate according to the invention produced from Fe$_3$SO$_4$ in accordance with Example 1 which is present predominantly in the metastrengite II crystal structure.
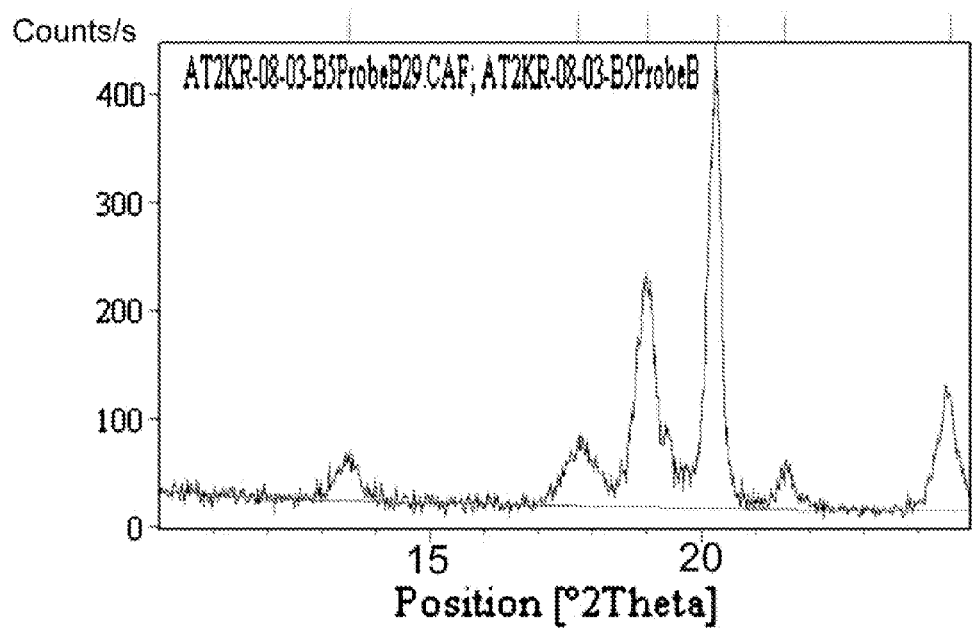
Figure 2b: an XRD spectrum of the iron (III) orthophosphate of Figure 2a.

PRODUCTION OF IRON ORTHOPHOSPHATE

CROSS-REFERENCE TO RELATED APPLICATIONS

The present application is the U.S. national stage application pursuant to 35 U.S.C. §371 of International Application No. PCT/EP2010/052108, filed Feb. 19, 2010, which claims priority from German Application 10 2009 001 204.4, filed Feb. 26, 2009, which applications are incorporated herein by reference in their entirety.

BACKGROUND OF THE INVENTION

The present invention concerns a process for the production of iron (III) orthophosphate of particularly high purity, an iron (III) orthophosphate produced by the process and the use thereof for the production of $LiFePO_4$ cathode material for Li-ion batteries, as dietary supplements for mineral enrichment and as a molluscicide.

Iron phosphates are used in many areas, for example as dietary supplements or as a nutritional supplement for mineral enrichment, as an active substance in molluscicides, in the ceramic industry or as a raw material for the production of $LiFePO_4$ cathode material for Li-ion batteries. In that respect each area of use makes individual demands on the iron phosphate, while in some uses in particular the chemical purity is of particular importance. In many cases the morphology or particle fineness of the iron phosphate also involves a critical significance for success with the application, for example when considering bioavailability for organisms.

Rechargeable Li-ion batteries are wide-spread power storage devices, in particular in the field of mobile electronics, as the Li-ion battery is distinguished by a high energy density and can supply a high rated voltage of 3.7 volts so that, with a comparable power output, the Li-ion battery is markedly smaller and lighter than conventional batteries. Spinels such as $LiCoO_2$, $LiNiO_2$, $LiNi_{1-x}Co_xO_2$ and $LiMn_nO_4$ have become established as cathode materials. To increase the reliability and safety of the Li-ion batteries, in particular in relation to thermal overloading in operation, $LiFePO_4$ was developed as the cathode material. That material is distinguished by better power output, higher specific capacitance and high thermal stability in operation.

High purity demands are made on the cathode material of a battery as any contamination which can involve unwanted redox reactions during operation (charging or discharging) detrimentally influences the power of the battery. The nature and concentration of the possible contaminations substantially depends on the quality of the raw materials used for production of the cathode material. Measures for subsequently reducing impurities can be implemented in the cathode material production process, which however is generally linked to an increase in the production costs. It is therefore desirable to use raw materials or starting materials which are as pure as possible for production of the cathode material.

A starting material for the production of $LiFePO_4$ for lithium ion batteries is iron orthophosphate, whose purity and structure or morphology substantially influences the quality of the cathode material produced therefrom.

Known processes for the production of iron (III) orthophosphate use $FeSO_4$ and $FeCl_3$ as starting materials or raw materials, but also metalorganic precursor compounds such as $FeC_2O_2$ (Gmelins Handbuch der anorganischen Chemie, Eisen Part B, pages 773 ff; U.S. Pat. No. 3,407,034; C Delacourt et al, Chem Mater 2003, 15 5051-5058; Zhicong Shi et al, Electrochemical and Solid State Letters 2005, 8, A396-A399). The phosphorus or phosphate components in those starting materials are introduced by way of a phosphate salt or phosphoric acid. The described processes also always require additions of HCl, NaOH, $NH_3$, $NaClO_3$ or surfactants in order to control the chemical-physical properties of the products obtained. The consequence of this is that the materials produced in that way always contain impurities of anions such as chloride or sulphate, cations such as sodium or ammonium, or organic compounds. On a large technical scale, those impurities can be removed if at all only by highly complicated and cost-intensive purification processes.

Further cationic contaminations such as for example transition metals which were originally contained in the raw materials used such as $FeSO_4$ or $FeCl_3$ can generally not be easily separated out or washed away as they also generally form phosphate salts which are difficult to dissolve and they crystallise jointly with the desired iron phosphate.

WO 02/30815 describes a process for the production of $LiFePO_4$ from iron phosphate and lithium, wherein an iron oxide is dissolved with heating in 85% phosphoric acid to produce the iron phosphate. The solution is then diluted until the solubility limit of $FePO_4$ is reached and the material crystallises. In that case, unwanted metal phosphates which have a smaller solubility product than $FePO_4$ are to be separated off by fractional dilution. That process suffers from the disadvantage that it requires a very high energy usage and needs a great deal of water to precipitate the product. That process involves the formation of a soluble complex of iron which is stable over weeks and which only slowly crystallises. That considerably reduces the commercial yield of the product. The yield can be increased by boiling the solution over several days, which however requires a very high application of energy. In addition the process involves the occurrence of a large amount of diluted phosphoric acid which can be introduced into the process again only after concentration thereof. The process is therefore not an attractive one both from economic and also ecological points of view.

The processes according to the state of the art for the production of iron phosphates have further disadvantages if the iron phosphate product obtained is to be used for the production of $LiFePO_4$ for Li-ion batteries. Important aspects in terms of suitability of the material are the morphology and the grain size distribution of the iron phosphates. Generally the processes of precipitation of iron phosphate in accordance with the state of the art result in generally spherical crystals of differing sizes. It will be noted however that they have a small surface area in comparison with other crystal morphologies. For use as a cathode material in Li-ion batteries an iron phosphate having a large crystal surface area is advantageous to ensure penetration of the lithium ions in large numbers and at high speed. In addition it is advantageous to produce crystals of small size to reduce the diffusion paths and times of the lithium ions. Furthermore a high bulk density and compressibility of the material is desirable to implement a high energy storage density in the cathode material produced.

Some of the aforementioned disadvantages and problems in the state of the art are overcome by an iron orthophosphate and a process for the production thereof in accordance with parallel-pending German patent application DE 10 2007 049 757. In that process oxidic iron (II)- iron (III)- or mixed iron (II, III) compounds are reacted with phosphoric acid with a concentration in the range of 5% to 50% and iron (II) possibly present after the reaction converted into iron (III) by the addition of an oxidising agent and solid iron (III) orthophosphate is separated from the reaction mixture. Iron (III) present in the starting material is precipitated directly as iron (III) orthophosphate by the addition of the phosphoric acid. The process however suffers from the disadvantage that in part the raw materials and the product are always present side-by-side as solid materials in the course of the reaction. As a result separation of impurities either as a solution or as solid materials is not possible. To achieve a high level of chemical purity for the product it is therefore necessary to rely on and establish the quality and purity of the raw materials.

The object of the present invention was therefore that of providing an iron (III) orthophosphate and a process for the production thereof, in which the known disadvantages from the state of the art are overcome and with which iron (III) orthophosphate can be obtained in a high state of purity in a simpler manner than known production processes.

BRIEF SUMMARY OF THE INVENTION

A process for the production of iron (III) orthophosphate of the general formula $FePO_4 \times nH_2O$ ($n \leq 2.5$) including the steps of:

a) producing an aqueous solution containing $Fe^{2+}$ ions by introducing, iron (II), iron (III) or mixed iron (II, III) compounds selected from hydroxides, oxides, oxide hydroxides, oxide hydrates, carbonates and hydroxide carbonates, together with elementary iron, into a phosphoric acid-bearing aqueous medium, to dissolve $Fe^{2+}$ ions and to react $Fe^{3+}$ with elementary Fe in a comproportionation reaction to give $Fe^{2+}$, b) separating solids from the phosphoric-acid aqueous $Fe^{2+}$ solution, and c) adding an oxidation agent to the phosphoric-acid aqueous $Fe^{2+}$ solution to oxidize iron (II) in the solution to precipitate iron (III) orthophosphate of the general formula $FePO_4 \times nH_2O$.

The invention also includes the iron (III) orthophosphate, its use to make $LiFePO_4$ and batteries made with the $LiFePO_4$.

BRIEF DESCRIPTION OF THE SEVERAL VIEWS OF THE DRAWINGS

FIG. 1a shows a scanning electron microscope image of an iron (III) orthophosphate with a metastrengite I crystal structure produced in accordance with a known process in accordance with the state of the art from $Fe(II)SO_4$.

FIG. 1b shows an XRD spectrum in the angle range of 5° to 70° 2Theta of the iron (III) orthophosphate of FIG. 1a.

FIG. 2a shows a scanning electron microscope image of an iron (III) orthophosphate according to the invention produced in accordance with Example 1 which is present predominantly in the metastrengite II crystal structure.

FIG. 2b shows an XRD spectrum in the angle range of 10° to 25° 2Theta of the iron (III) orthophosphate of FIG. 2a.

DETAILED DESCRIPTION OF THE INVENTION

In the process according to the invention the starting materials (oxidic iron raw material, elementary iron) can be used in powder form, preferably with grain sizes D50 in the range of 0.01 µm to 300 µm, and mixed and reacted directly with the phosphoric acid-bearing aqueous medium, preferably with dilute phosphoric acid. Alternatively the starting materials or a part of the starting materials can be firstly freshly produced by way of precipitation and possibly subsequent calcining and subsequently further processed in the form of a filter cake. The result is a slurry which is clouded or coloured by the solids proportion of the raw material (black to brown to red).

When reference is made herein to aqueous solvent that embraces embodiments which contain exclusively water as the fluid medium, but also those embodiments in which the fluid medium comprises water to a preferably predominant proportion thereof, but can also contain proportions of water-miscible organic and/or ionic solvents or fluids. It is known that such solvent additives can have an influence on crystal growth and thus on the resulting morphology of the product.

A redox reaction occurs in the phosphoric acid-bearing aqueous medium between $Fe^{3+}$ from the oxidic iron raw material and the elementary iron, wherein soluble $Fe^{2+}$ is formed in a comproportionation reaction in accordance with the following reaction equation (I):

$$2Fe^{3+} + Fe \rightarrow 3Fe^{2+} \qquad (I)$$

The reaction batch is heated by about 2 to 25° C. depending on the respective raw material if the resulting reaction heat is not dissipated, which in principle is not necessary. After the reaction has died down the batch is heated with agitation to higher temperatures, preferably below 65° C., in which case the introduced solids, depending on the respective composition and purity, react more or less completely with the formation of a typically green-coloured $Fe^{2+}$ solution. After about 50 to 120 min that process step is concluded. The duration depends inter alia on the levels of concentration and raw materials used.

Depending on the respective purity of the solid materials used a more or less pronounced clouding remains in the solution, which is caused by compounds which are insoluble under the reaction conditions. That remaining solids proportion can be removed by simple filtration, sedimentation, centrifuging or other suitable means. The proportions of those solids vary depending on the respective choice of the starting materials introduced into the process, the acid concentration and the reaction temperature.

To remove further impurities or unwanted substances and compounds from the solution defined precipitation reagents can advantageously be added to the solution. Thus for example the calcium content in the solution can be reduced by the addition of small amounts of sulphuric acid, with the precipitation of calcium sulphate. Furthermore additional electrolytic precipitation or separation of unwanted metal ions from the solution can also advantageously be performed before iron (III) is produced in the iron (II) solution by oxidation and the iron (III) orthophosphate is precipitated.

An advantage of the process according to the invention is that a homogeneous phosphoric-acid aqueous iron (II) solution is produced as an intermediate product, from which all impurities which are present in the form of solid materials or which can be converted into solid materials by precipitation additives or which can be electrolytically separated off can be removed using simple means before the iron (III) orthophosphate is produced by oxidation in the suitable iron (II) solution produced as the intermediate product, and in turn precipitates as a solid material. The solid material iron (III) orthophosphate is accordingly not present in the aqueous solution at the same time beside other originally employed insoluble starting compounds, as is the case for example with the process in accordance with parallel-pending German patent application DE 10 2007 049 757. As a result the process according to the invention in comparison with other processes allows the production of iron (III) orthophosphate with a high degree of purity without in particular complicated and expensive cleaning processes having to be subsequently carried out.

In an embodiment of the process according to the invention the reaction of the oxidic iron compounds is performed together with elementary iron in a phosphoric acid-bearing aqueous medium at a temperature in the range of 15° C. to 90°

C., preferably in the range of 20° C. to 75° C., particularly preferably in the range of 25° C. to 65° C. At an excessively low temperature the reaction speed is slow and possibly uneconomical. At an excessively high temperature the situation can in part involve premature precipitation of iron (III) orthophosphate inter alia by virtue of possible solid body reaction at the solid starting materials contained in the suspension. In addition the progress of secondary reactions, as are described hereinafter, is promoted by an excessively high temperature.

Desirably the reaction of the oxidic iron compounds is performed together with elementary iron in a phosphoric acid-bearing aqueous medium with intensive thorough mixing, preferably by stirring agitation. All mixers and agitators which are known in the field and which are suitable for such a purpose of use can be used for that purpose. It is also advantageously possible to use jet mixers, homogenisers, flow reaction cells etc for thorough mixing and/or for moving the reaction batch.

In a further embodiment of the process according to the invention the reaction of the oxidic iron compounds is performed together with elementary iron in a phosphoric acid-bearing aqueous medium for a period of 1 min to 120 min, preferably 5 min to 60 min, particularly preferably 20 min to 40 min. Reaction of the iron compounds together with elementary iron in phosphoric acid-bearing aqueous medium can obviously be broken off at any time by separation of the solids from the aqueous solution, that under some circumstances involving a loss of yield with incomplete reaction.

In the process according to the invention the concentration of the phosphoric acid in the aqueous medium is appropriately 5% to 85%, preferably 10% to 40%, particularly preferably 15% to 30%, with respect to the weight of the aqueous solution. Low levels of phosphoric acid concentration are economically advantageous, in which case the reaction can take place very slowly with excessively low levels of concentration, which may also be undesirable from economic points of view. With high levels of phosphoric acid concentration such as for example over 35%, depending on the respective fineness of the oxidic iron compounds used, lump formation thereof may occur, which considerably increases the duration of the above-described comproportionation reaction between $Fe^{3+}$ and elementary iron. An influence of the phosphoric acid concentration on the fineness of the end product was also observed. Thus a lower phosphoric acid concentration rather leads to a finer end product with a mean particle size D50<35 μm whereas a higher phosphoric acid concentration rather promotes the production of a coarser end product with a mean particle size D50>35 μm. The phosphoric acid concentration can be adjusted for the precipitation step after the comproportionation reaction between $Fe^{3+}$ and elementary iron, by concentrated phosphoric acid or water being added or by water contained therein being removed by evaporation. That affords a possible way of controlling the fineness of the end product iron (III) orthophosphate independently of the amounts of raw materials used for production of the $Fe^{2+}$ solution.

In a secondary reaction between the elementary iron and the phosphoric acid, hydrogen gas is produced in accordance with the following equation reaction (II), and for safety reasons that has to be specifically targetedly removed:

$$Fe+H_3PO_4 \rightarrow Fe^{2+}+HPO_4^{2-}+H_2 \tag{II}$$

That secondary reaction cannot be suppressed so that a stoichiometric excess of elementary iron always has to be used in relation to the amount which is required for the reaction of $Fe^{3+}$ in the oxidic iron raw material in accordance with the above-indicated reaction equation (I). The exact amount of that excess substantially depends on the reaction conditions like the fineness or surface activity of the solids used, temperature and acid concentration. An excess of a few percent of the stoichiometric amount has proven to be adequate in many cases. At temperatures above 40° C. a rise in the speed of the secondary reactions was observed. Above 70° C. simultaneous precipitation of iron orthophosphate can occur, so that a homogeneous $Fe^{2+}$ solution is not obtained. If the lumping effect of the oxidic iron component as already referred to above occurs, the elementary iron reacts to completion substantially by way of the secondary reaction. The corresponding stoichiometries are therefore to be adapted to the respectively selected reaction conditions and the reactivity of the raw materials used.

After dissolution of the iron (II) from the oxidic starting material and reaction of the iron (III) and the elementary iron by comproportionation to give iron (II), after the above-described removal of impurities which are possibly present, heating of the reaction is broken off or the temperature is limited to desirably about 85 to 100° C. and oxidation agent is added until substantially the entire proportion of iron (II) has been oxidised to iron (III) and it is not possible to detect any more iron (II) or the concentration thereof has fallen below a predetermined iron (II) concentration. Under those conditions iron (III) orthophosphate precipitates in the form of beige-white to slightly pink-coloured solid. The aforementioned temperature range of about 85 to 100° C. is preferred according to the invention for the oxidation and precipitation step but other temperature ranges are not excluded. The product can be separated off in the form of a solid by filtration or other current processes. Various products of the general formula $FePO_4 \times nH_2O$ (n≤2.5) can be obtained by drying at various levels of drying intensity.

The morphology of the product can be controlled by already adjusting the acid concentration at the beginning during the dissolution process or however also only later shortly before or during the oxidation process. A product of high bulk density is obtained if precipitation is performed at an acid concentration of 23-25%. Products with lower bulk densities are obtained at higher and lower levels of concentration.

In a preferred embodiment of the process according to the invention the oxidation agent which is added to oxidise iron (II) in the solution is an aqueous solution of hydrogen peroxide ($H_2O_2$). Preferably the hydrogen peroxide solution has a concentration of 15 to 50% by weight, particularly preferably 30 to 40% by weight.

In alternative embodiments of the process according to the invention the oxidation agent which is added to oxidise iron (II) in the solution is a gaseous medium which is selected from air, pure oxygen or ozone and which is blown into the aqueous solution.

Oxidation by the addition of a suitable oxidation agent is preferably performed directly after separation of the solid materials from the phosphoric-acid aqueous $Fe^{2+}$ solution. In the oxidation reaction the temperature of the reaction mixture can be kept at the temperature previously set for reaction of the iron compounds, or in the proximity thereof. A preferred temperature range is about 85 to 100° C. Alternatively the oxidation reaction can be carried out after cooling of the solution to ambient temperature or therebelow, whereby however the precipitation of the iron (III) orthophosphate formed is not promoted. Both the oxidation reaction and also precipitation of the iron (III) orthophosphate formed generally take place more easily and more quickly at elevated temperature, so that it is preferable for that step to be performed at a moderately elevated temperature.

The oxidation reaction is carried out until no or substantially no more iron (II) can be detected in the reaction mixture. Known quick tests (for example test bars or test strips) are available to the man skilled in the art for the detection of iron (II) in the aqueous solution, the accuracy thereof being sufficient for the purposes of the present invention. Separation of the iron (III) orthophosphate from the aqueous solution is preferably effected by filtration, sedimentation, centrifuging or combinations of the aforementioned separation processes. Desirably the iron (III) orthophosphate separated out of the reaction mixture is then dried at elevated temperature and/or under reduced pressure. Alternatively after the separation operation the iron (III) orthophosphate can also advantageously be subjected to further processing in moist form in the form of a filter cake or dispersion with solid contents of 1 to 90% by weight, in accordance with the respectively possible or desired efficiency of the water removal step.

The process according to the invention for the production of iron (III) orthophosphate also has some ecological and economic advantages over other known processes, besides the high purity of the end product that can be achieved. The mother liquor remaining behind after the separation of iron (III) orthophosphate contains substantially no contaminating reaction products such as for example sulphates or chlorides which remain behind in the known processes in the state of the art and in which iron sulphate or iron chloride is used as the starting material. Mother liquor from the process according to the present invention can therefore be adjusted again to the desired concentration by the addition of concentrated phosphoric acid and can thus be completely recycled into the process. That saves on costs and avoids unwanted wastage.

The present invention also includes iron (III) orthophosphate produced in accordance with the process according to the invention as described herein.

The iron (III) orthophosphate according to the invention can be produced not only more easily and at lower cost and with a particularly high degree of purity, in comparison with the state of the art, it also differs structurally and in terms of its composition or impurities from iron (III) orthophosphate which was produced in accordance with known processes from the state of the art. The iron (II)-, iron (III)- and mixed iron (II, III) compounds which are selected from hydroxides, oxides, oxide hydroxides, oxide hydrates, carbonates and hydroxide carbonates, that are used as starting materials, also contribute inter alia thereto. In contrast to the present invention known processes for the production of iron (III) orthophosphate in accordance with the state of the art use inter alia iron sulphate or sulphate-bearing raw materials and/or nitrate-bearing raw materials and control the variation in the pH-value of the reaction with soda lye. The iron phosphates obtained therefore contain high levels of residues of sulphur, predominantly in the form of sulphate, nitrate and sodium.

An excessively high content of sulphur, mostly in the form of sulphate, and an excessively high content of nitrate, adversely affect the quality of an $LiFePO_4$ cathode material produced from the iron (III) orthophosphate for Li-ion batteries as those anions involve unwanted redox reactions. In an embodiment of the present invention therefore the iron (III) orthophosphate has a sulphur content of <300 ppm, preferably <200 ppm, particularly preferably <100 ppm. In a further embodiment of the present invention the iron (III) orthophosphate has a nitrate content of <300 ppm, preferably <200 ppm, particularly preferably <100 ppm.

Sodium and potassium cations also adversely affect the quality of an $LiFePO_4$ cathode material produced from the iron (III) orthophosphate as they can occupy lithium sites. In a further embodiment of the invention therefore the iron (III) orthophosphate has a content of sodium and potassium respectively of <300 ppm, preferably <200 ppm, particularly preferably <100 ppm.

Excessively high levels of contamination in respect of metals and transition metals also adversely affect the quality of an $LiFePO_4$ cathode material produced from the iron (III) orthophosphate. In a further embodiment of the invention therefore the iron (III) orthophosphate has a content of metals and transition metals, excluding iron, respectively of <300 ppm, preferably <200 ppm, particularly preferably <100 ppm.

The properties of the product according to the invention, namely the iron (III) orthophosphate according to the invention, are substantially influenced by its production process and the starting materials used for its production, and differ from the iron (III) orthophosphate according to the state of the art.

Iron (III) orthophosphates which are produced in accordance with generally known processes from iron sulphate or iron chloride also have differences in the crystal structure. X-ray structure investigations have shown that iron (III) orthophosphates produced from iron sulphate or iron chloride in accordance with the state of the art are predominantly present in the metastrengite I structure with small proportions of strangite and metastrengite II (phosphosiderite). In comparison in X-ray structure investigations on iron (III) orthophosphates produced according to the invention it was found that they are predominantly present in the metastrengite II structure (phosphosiderite) with very small or undetectable proportions of strengite and metastrengite I.

In an embodiment of the iron (III) orthophosphate according to the invention therefore >80% by weight, preferably >90% by weight, particularly preferably >95% by weight of the iron (III) orthophosphate are present in the metastrengite II (phosphosiderite) crystal structure.

The occurrence of the three above-described allotropic forms of iron (III) orthophosphate (metastrengite I, metastrengite II and strengite) is described in the literature as well as the difficulty of producing a pure-phase system (C Delacourt et al, Chem Mater 2003, 15, 5051-5058). Contrary to the reservations expressed in the literature the inventors have now discovered that, with the process described herein, the iron (III) phosphate can also be represented in the metastrengite II structure in a pH value range determined solely by the phosphoric acid, in a notably pure form.

The iron (III) orthophosphate preferably has a plate-like morphology with metastrengite II structure. That structure permits considerably denser packing of the crystals and particles, in comparison with spherical particles, with a lower exclusion volume. Accordingly high bulk densities and tamping densities can be achieved with the iron (III) orthophosphate according to the invention, which is particularly advantageous for use in $LiFePO_4$ cathode materials. A small thickness in respect of the crystal plates ensures for example a high reaction speed in the production of $LiFePO_4$ as well as a higher efficiency in the finished cathode material as the diffusion paths and times of the Li-ions can be markedly reduced in comparison with conventional material. In addition aggregates/agglomerates of that material, which are of a layer-like structure, can be easily converted into dispersions of the primary particles by common methods under the effect of shearing forces (Turrax, agitator ball mill, ultrasound etc).

In an embodiment of the invention the iron (III) orthophosphate is present in the form of plate-like crystals. Preferably those crystals are of a small thickness in the region of less than 1000 nm, preferably <500 nm, particularly preferably <300 nm, quite particularly preferably <100 nm. The dimensions of the plate-like crystals in the two dimensions perpendicular to the thickness are preferably in the range of 200 to 2000 nm, particularly preferably 300 to 900 nm, quite particularly preferably 400 to 800 nm.

In addition the iron (III) orthophosphate according to the invention in a preferred embodiment has a bulk density >400 g/l, preferably >700 g/l, particularly preferably >1000 g/l. In a further embodiment the iron (III) orthophosphate according to the invention has a tamped density >600 g/l, preferably >750 g/l, particularly preferably >1100 g/l.

The iron (III) orthophosphate according to the invention thus exhibits a very fine primary particle size and nonetheless at the same time a very high achievable bulk density and a high tamped density. That was surprising in comparison with the state of the art. Iron (III) orthophosphates which are produced in accordance with generally known processes from iron sulphate or iron chloride usually have a primary particle size of >1 µm, whereby it is also possible to achieve high bulk densities of >1000 g/l. If corresponding iron (III) orthophosphates with smaller primary particle sizes in the submicrometer range are produced using those known processes from iron sulphate or iron chloride, only low bulk densities of up to 400 g/l can be achieved. The reasons for this are presumably in the particle morphology and the particle size distribution, influenced by the crystal structure. The morphology of iron (III) phosphates produced in accordance with generally known processes from iron sulphate or iron chloride predominantly comprises spherical particles whereas the iron (III) orthophosphate according to the invention has the morphology already described hereinbefore with a high proportion of angular, plate-like crystals.

The present invention also includes the use of the iron (III) orthophosphate according to the invention for the production of $LiFePO_4$ cathode material for Li-ion batteries. The production of such a cathode material using iron (III) orthophosphate is known per se to the man skilled in the art, but the iron (III) orthophosphate according to the invention here offers the above-described particular advantages.

Furthermore the present invention includes $LiFePO_4$ cathode material for Li-ion batteries, produced using iron (III) orthophosphate as is described and claimed herein, as well as Li-ion batteries which include an $LiFePO_4$ cathode material of the aforementioned kind.

In a further aspect the invention also includes the use of the iron (III) orthophosphate according to the invention as a dietary supplement and for mineral enrichment of foodstuffs as it is suitable for foodstuffs and has a very high bioavailability for the organism. The iron (III) orthophosphate according to the invention is here used to particular advantage in the form of aqueous dispersions.

In a further aspect the invention also includes the use of the iron (III) orthophosphate according to the invention as a molluscicide, for example when controlling snails. Iron (III) orthophosphate is known per se for its molluscicide action. It leads to the creatures sliming out. The iron (III) orthophosphate according to the invention is particularly effective by virtue of its structurally conditioned high bioavailability in comparison with conventionally produced iron (III) phosphate so that less substance is required to achieve the same effect. The iron (III) orthophosphate according to the invention is used to particular advantage here in the form of aqueous dispersions.

Further advantages, features and embodiments of the present invention are set forth in the following Examples which describe the present invention but which are not intended to limit it.

EXAMPLES

Example 1

A dilute phosphoric acid (18% by weight; density=1.146 g/ml at 20° C.) is provided at ambient temperature (AT: 20° C.) and mixed with 20 g of iron oxide (magnetite; $Fe_3O_4$). The batch is homogenised at 10,000 rpm for 10 min with a dispersing rod. The resulting suspension is then mixed with agitation with 7 g of iron powder.

An exothermic reaction starts. The temperature rises from about 20° C. to about 40° C. within 20 min. The suspension changes its colour from black to green-brown in that period and the starting material is dissolved. By virtue of small bubbles in the suspension it can be seen that gas development ($H_2$) is occurring. The amount of gas produced is quantified with a bubble counter. After the dissolution process is concluded the solution is filtered to separate solid substances from the solution. The solution is then heated to 80° C. and mixed with about 55 ml of $H_2O_2$ (35% by weight) to oxidise the $Fe^{2+}$ ions in the solution to $Fe^{3+}$ ions. Oxygen is produced as the decomposition product of $H_2O_2$. By means of a quick test for $Fe^{2+}$ ions (test bars from Merck) a check is made to see whether the oxidation reaction is complete. $H_2O_2$ is possibly added. The solution which is now pink-coloured is kept at about 85° C. and iron (III) orthophosphate is precipitated. Precipitation lasts for about 30 min. The end product is light pink and is sucked away after precipitation by way of a frit and washed with 400 ml of water. The finer the material, the longer can the suction removal procedure last. The product is then dried in a drying cabinet for 3 h at 80° C. The yield is at least 90%. The end product is a fine iron (III) orthophosphate.

Example 2

Like Example 1 but a somewhat more highly concentrated phosphoric acid is provided (25% by weight; density=1.208 g/ml at 20° C.) and after the oxidation reaction the iron (III) orthophosphate is precipitated at 100° C. The yield is over 90%. The end product is an iron (III) orthophosphate which is coarse in comparison with Example 1.

Example 3

20 g of $Fe_3O_4$ is provided in 125 g of $H_2O$ and subjected to preliminary treatment with an Ultraturrax at 10,000 rpm for 30 min. 125 g of 75% phosphoric acid, a further 125 g of $H_2O$ and 7 g of Fe are then added at AT. The density of the dilute phosphoric acid in the batch is 1.146 g/ml at 20° C. Slight gas development occurs, which persists over the entire reaction period. The temperature rises to 42° C. and the colour of the suspension alters towards brown within 7 min. After 9 min no further temperature increase is found and therefore the reaction mixture is heated in an oil bath (T=120° C.). After 70 min there is a green solution which has very slight clouding. No further gas development is observed. The clouding is removed by filtration and the filtrate is mixed with 40 ml of $H_2O_2$ solution (35% by weight) at 80° C. A change in colour occurs by way of intensive red to light pink, the product precipitating in the form of a fine solid of light pink colour. The yield is 99.8% (71.7 g).

Example 4

20 g of $Fe_3O_4$, 7 g of Fe, 250 g of $H_2O$ and 125 g of 75% phosphoric acid are brought together at AT. The density of the dilute phosphoric acid in the batch is 1.146 g/ml at 20° C.

Slight gas development occurs, which persists over the entire reaction period. The temperature rises to 38° C. and the colour of the suspension alters towards brown within 20 min. After 30 min no further temperature increase is found and therefore the reaction mixture is heated in an oil bath (T=120° C.). After 90 min there is a green solution which has very slight clouding. No further gas development is observed. The clouding is removed by filtration and the filtrate is mixed with 40 ml of $H_2O_2$ solution (35% by weight) at 85° C. A change in colour occurs by way of intensive red to light pink, the product precipitating in the form of a fine solid of light pink colour. The yield is 83.5% (60.0 g).

Example 5

20 g of $Fe_3O_4$, 7 g of Fe, 250 g of $H_2O$ and 204 g of 75% phosphoric acid are brought together at AT. The density of the dilute phosphoric acid in the batch is 1.232 g/ml at 20° C. Slight gas development occurs, which persists over the entire reaction period. The temperature rises to 53° C. and the colour of the suspension alters towards brown within 10 min. Cooling to 50° C. is immediately effected by means of an ice bath. After a further 40 min at 50° C. there is a green solution which has very slight clouding. No further gas development is observed. The clouding is removed by filtration and the filtrate is mixed with 40 ml of $H_2O_2$ solution (35% by weight) at 85° C. A change in colour occurs by way of intensive red to light pink, the product precipitating in the form of a coarse solid of light pink colour. The yield is 85.8% (61.6 g).

Example 6

10 g $Fe_2O_3$, 3.2 g of Fe, 211 g of $H_2O$ and 125 g of 75% phosphoric acid are brought together at 50° C. The density of the dilute phosphoric acid in the batch is 1.134 g/ml at 20° C. Slight gas development occurs, which persists over the entire reaction period. After 157 min at 50° C. there is a green solution which has very slight clouding. No further gas development is observed. The clouding is removed by filtration and the filtrate is mixed with 20 ml of $H_2O_2$ solution (35% by weight) at 85° C. A change in colour occurs by way of intensive red to light pink, the product precipitating in the form of a fine solid of light pink colour. The yield is 30.2 g.

Example 7

10 g $Fe_2O_3$, 11 g of Fe, 379 g of $H_2O$ and 168 g of 75% phosphoric acid are brought together at AT. The density of the dilute phosphoric acid in the batch is 1.134 g/ml at 20° C. Slight gas development occurs, which persists over the entire reaction period. Heating to 63° C. is effected and after 120 min there is a green solution which has very slight clouding. No further gas development is observed. The clouding is removed by filtration and the filtrate is mixed with 30 ml of $H_2O_2$ solution (35% by weight) at 85° C. A change in colour occurs by way of intensive red to light pink, the product precipitating in the form of a fine solid of light pink colour. The yield is 58.0 g.

What is claimed is:

1. A process for the production of iron (III) orthophosphate of the general formula $FePO_4 \times nH_2O$ ($n \leq 2.5$) comprising:

a) producing an aqueous solution containing $Fe^{2+}$ ions by introducing, iron (II), iron (III) or mixed iron (II, III) compounds selected from the group consisting of hydroxides, oxides, oxide hydroxides, oxide hydrates, carbonates and hydroxide carbonates, together with elementary iron, into a phosphoric acid-bearing aqueous medium, to dissolve $Fe^{2+}$ ions and to react $Fe^{3+}$ with elementary Fe in a comproportionation reaction to give $Fe^{2+}$, b) separating solids from the phosphoric-acid aqueous $Fe^{2+}$ solution, and c) adding an oxidation agent to the phosphoric-acid aqueous $Fe^{2+}$ solution to oxidize iron (II) in the solution to precipitate iron (III) orthophosphate of the general formula $FePO_4 \times nH_2O$.

2. A process according to claim 1 wherein precipitation reagents are added to the phosphoric-acid aqueous solution to precipitate solids from the solution, and to separate same from the phosphoric-acid aqueous $Fe^{2+}$ solution.

3. A process according to claim 1 wherein the reaction of the oxidic iron compounds is performed together with elementary iron in a phosphoric acid-bearing aqueous medium (step a) at a temperature in the range of 15° C. to 90° C.

4. A process according to claim 3 wherein the temperature is in the range of 25° C. to 65° C.

5. A process according to claim 1 wherein the reaction of the oxidic iron compounds is performed together with elementary iron in a phosphoric acid-bearing aqueous medium (step a) for a period of 1 to 120 minutes.

6. The process according to claim 5 wherein the time is from 20 to 40 minutes.

7. A process according to claim 1 wherein the concentration of the phosphoric acid in the aqueous medium is 5% to 85%, with respect to the weight of the aqueous solution.

8. A process according to claim 7 wherein the concentration of the phosphoric acid in the aqueous medium is 10% to 40%, with respect to the weight of the aqueous solution.

9. A process according to claim 1 wherein the oxidation agent added to oxidize iron (II) in the solution is an aqueous solution of hydrogen peroxide ($H_2O_2$).

10. A process according to claim 9 wherein the concentration of the hydrogen peroxide added to oxidize iron (II) in the solution is in a concentration of 15 to 50% by weight.

11. A process according to claim 1 wherein the oxidation agent added to oxidize iron (II) in the solution is a gaseous medium air, pure oxygen or ozone and which is blown into the aqueous solution.

12. A process according to claim 1 wherein the iron (III) orthophosphate is separated from the aqueous solution after step c and is dried after the separation operation at elevated temperature and/or under reduced pressure, or the iron (III) orthophosphate is prepared after step c as an aqueous dispersion with a solids content of 1 to 90% by weight.

13. A process according to claim 1 wherein metals dissolved in the phosphoric-acid aqueous solution, are electrolytically separated out of the solution.

14. A process according to claim 2 wherein metals dissolved in the phosphoric-acid aqueous solution, are electrolytically separated out of the solution.

* * * * *